US009420511B2

(12) United States Patent
Gupta Hyde et al.

(10) Patent No.: US 9,420,511 B2
(45) Date of Patent: Aug. 16, 2016

(54) SIGNALING QOS REQUIREMENTS AND UE POWER PREFERENCE IN LTE-A NETWORKS

(71) Applicant: Intel Corporation, Santa Clara, CA (US)

(72) Inventors: Maruti Gupta Hyde, Portland, OR (US); Satish Chandra Jha, Hillsboro, OR (US); Ali Taha Koc, Portland, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,092

(22) PCT Filed: Sep. 17, 2013

(86) PCT No.: PCT/US2013/060146
§ 371 (c)(1),
(2) Date: Dec. 17, 2013

(87) PCT Pub. No.: WO2014/070321
PCT Pub. Date: May 8, 2014

(65) Prior Publication Data
US 2015/0230179 A1    Aug. 13, 2015

Related U.S. Application Data

(60) Provisional application No. 61/721,436, filed on Nov. 1, 2012.

(51) Int. Cl.
*H04W 52/02*    (2009.01)
*H04W 36/20*    (2009.01)
(Continued)

(52) U.S. Cl.
CPC ............. *H04W 36/20* (2013.01); *H04B 7/0417* (2013.01); *H04B 7/0452* (2013.01);
(Continued)

(58) Field of Classification Search
None
See application file for complete search history.

(56) References Cited

U.S. PATENT DOCUMENTS

2001/0051994 A1    12/2001   Serizawa et al.
2005/0124372 A1     6/2005   Lundby et al.
(Continued)

FOREIGN PATENT DOCUMENTS

EP         2369883 A1      9/2011
KR    1020120094369 A      8/2012
(Continued)

OTHER PUBLICATIONS

"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.
(Continued)

*Primary Examiner* — Gregory Sefcheck
*Assistant Examiner* — Jenkey Van
(74) *Attorney, Agent, or Firm* — Schwegman Lundberg & Woessner, P.A.

(57) ABSTRACT

Embodiments for signaling quality of service (QoS) requirements and user equipment (UE) power preference in LTE-A networks are generally described herein. In some embodiments, a power preference indication (PPI) is received at an eNB from a UE to set a power saving preference for the UE. A communication session is established using radio resource control (RRC) messages between the UE and the eNB to identify a preference for QoS configuration for handling traffic provided to the UE by the eNB. The QoS for traffic provided by the eNB to the UE is managed by the eNB based on the identified preference for QoS configuration for handling traffic provided to the UE.

12 Claims, 6 Drawing Sheets

(51) Int. Cl.

| | | |
|---|---|---|
| *H04W 28/24* | (2009.01) | |
| *H04W 24/08* | (2009.01) | |
| *H04J 3/06* | (2006.01) | |
| *H04L 5/00* | (2006.01) | |
| *H04W 16/24* | (2009.01) | |
| *H04W 8/00* | (2009.01) | |
| *H04W 72/04* | (2009.01) | |
| *H04W 76/02* | (2009.01) | |
| *H04B 7/04* | (2006.01) | |
| *H04B 7/06* | (2006.01) | |
| *H04W 28/02* | (2009.01) | |
| *H04W 4/00* | (2009.01) | |
| *H04W 76/04* | (2009.01) | |
| *H04L 29/12* | (2006.01) | |
| *H04W 16/20* | (2009.01) | |
| *H04W 16/26* | (2009.01) | |
| *H04W 60/04* | (2009.01) | |
| *H04W 64/00* | (2009.01) | |
| *H04W 36/14* | (2009.01) | |

(52) U.S. Cl.
CPC .......... *H04B 7/0626* (2013.01); *H04J 3/0614* (2013.01); *H04L 5/0046* (2013.01); *H04L 5/0048* (2013.01); *H04L 61/3005* (2013.01); *H04L 61/3075* (2013.01); *H04W 4/005* (2013.01); *H04W 8/005* (2013.01); *H04W 16/20* (2013.01); *H04W 16/24* (2013.01); *H04W 16/26* (2013.01); *H04W 24/08* (2013.01); *H04W 28/0268* (2013.01); *H04W 28/24* (2013.01); *H04W 36/14* (2013.01); *H04W 52/0216* (2013.01); *H04W 52/0235* (2013.01); *H04W 60/04* (2013.01); *H04W 64/003* (2013.01); *H04W 72/042* (2013.01); *H04W 72/0413* (2013.01); *H04W 72/0446* (2013.01); *H04W 76/023* (2013.01); *H04W 76/046* (2013.01); *Y02B 60/50* (2013.01)

(56) References Cited

U.S. PATENT DOCUMENTS

| | | | |
|---|---|---|---|
| 2007/0298725 | A1 | 12/2007 | Ryu |
| 2008/0188247 | A1 | 8/2008 | Worrall |
| 2010/0074109 | A1 | 3/2010 | Klingenbrunn et al. |
| 2011/0038326 | A1 | 2/2011 | Davies et al. |
| 2011/0059744 | A1 | 3/2011 | Won et al. |
| 2011/0110347 | A1 | 5/2011 | Mun |
| 2011/0149728 | A1 | 6/2011 | Lee |
| 2011/0190000 | A1 | 8/2011 | Kwun |
| 2011/0310769 | A1 | 12/2011 | Lee et al. |
| 2011/0319065 | A1 | 12/2011 | Dalsgaard et al. |
| 2012/0155406 | A1 | 6/2012 | Kim et al. |
| 2012/0213137 | A1 | 8/2012 | Jeong et al. |
| 2012/0252518 | A1 | 10/2012 | Karampatsis et al. |
| 2012/0320791 | A1* | 12/2012 | Guo et al. ............ 370/254 |
| 2013/0080597 | A1 | 3/2013 | Liao |
| 2013/0294307 | A1* | 11/2013 | Johansson et al. ............ 370/311 |
| 2013/0295905 | A1* | 11/2013 | Islam et al. ............ 455/418 |
| 2013/0303206 | A1 | 11/2013 | Starsinic et al. |
| 2013/0343252 | A1* | 12/2013 | Chakraborty et al. ...... 370/311 |
| 2014/0016614 | A1 | 1/2014 | Velev et al. |
| 2014/0018085 | A1* | 1/2014 | Young et al. ............ 455/450 |
| 2014/0036750 | A1* | 2/2014 | Yavuz et al. ............ 370/311 |
| 2014/0044029 | A1* | 2/2014 | Chou et al. ............ 370/311 |
| 2014/0113667 | A1 | 4/2014 | Keller et al. |
| 2014/0269779 | A1 | 9/2014 | Shan et al. |

FOREIGN PATENT DOCUMENTS

| | | |
|---|---|---|
| KR | 1020120096408 A | 8/2012 |
| WO | WO-2004045083 A2 | 5/2004 |
| WO | WO-2014070321 A1 | 5/2014 |
| WO | WO-2014070649 A1 | 5/2014 |
| WO | WO-2014070901 A1 | 5/2014 |
| WO | WO-2014070929 A1 | 5/2014 |

OTHER PUBLICATIONS

"Evolved Universal Terrestrial Radio Access (E-UTRA); Radio Resource Control (RRC);", 3GPP TS 36.331 V11.1.0 (Sep. 2012) Technical Specification Group Radio Access Network; Protocol specification (Release 11), (Sep. 2012), 325 pgs.

"Evolved Universal Terrestrial Radio Access (E-UTRA); Study on signalling and procedure for interference avoidance for in-device coexistence", 3GPP TR 36.816 V11.1.0 (Sep. 2011) Technical Specification Group Radio Access Network (Release 11), (Sep. 2011), 44 pgs.

"Inter-RAT mobility for UE under IDC interference", 3GPP TSG-RAN WG2 #79bis; R2-124725; Agenda Item 7.6.3; LG Electronics Inc., (Oct. 8, 2012), 1 pg.

"Inter-RAT operation for in-device coexistence", 3GPP TSG RAN WG2 Meeting #80; R2-125750; Agenda Item 7.6.1; Intel Corporation, (Nov. 12, 2012), 2 pgs.

"Title Change Request", 3GPP TSG-RAN WG2 Meeting #79bis; R2-125108, (Oct. 8, 2012), 5 pgs.

Hong, Wei, et al., "Considering In-Device Coexistence interference from WiFi point of view", IEEE 802.11-13/0880-00, (Jul. 17, 2013), 13 pgs.

"3GPP MTC Standard TTA M2M Seminar", ETRI Standards Research Center, [Online] retrieved from the internet: <edu.tta.or.kr/sub3/down.php?No=123&file=M2M_1-4.pdf>, (Oct. 23, 2012).

"U.S. Appl. No. 14/126,611, Non Final Office Action mailed Oct. 23, 2014", 10 pgs.

"The Mobile Broadband Standard", 3GPP List of Work Items, [Online] retrieved from the internet: <http://www.3gpp.org/DynaReport/Wi-List.html>.

"U.S. Appl. No. 14/124,939, Preliminary Amendment filed Dec. 9, 2013", 9 pgs.

"U.S. Appl. No. 14/126,611, Preliminary Amendment filed Dec. 16, 2013", 11 pgs.

"Evaluation of MTC Device triggering", HTC, TD S2-110732, 3GPP TSG SA WG2 Meeting #83, (Feb. 2011), 2 pgs.

"International Application Serial No. PCT/US2013/060146, International Search Report mailed Dec. 27, 2013", 5 pgs.

"International Application Serial No. PCT/US2013/060146, Written Opinion mailed Dec. 27, 2013", 5 pgs.

"International Application Serial No. PCT/US2013/067043, International Search Report mailed Feb. 25, 2014", 4 pgs.

"International Application Serial No. PCT/US2013/067043, Written Opinion mailed Feb. 25, 2014", 6 pgs.

"International Application Serial No. PCT/US2013/067522, International Search Report mailed Feb. 12, 2014", 3 pgs.

"International Application Serial No. PCT/US2013/067522, Written Opinion mailed Feb. 12, 2014", 6 pgs.

"International Application Serial No. PCT/US2013/067575, International Search Report mailed Feb. 21, 2014", 3 pgs.

"International Application Serial No. PCT/US2013/067575, Written Opinion mailed Feb. 21, 2014", 6 pgs.

"Triggering a detached MTC device", InterDigital Communications, TD S2-110673, 3GPP TSG SA WG2 Meeting #83, (Feb. 2011), 4 pgs.

* cited by examiner

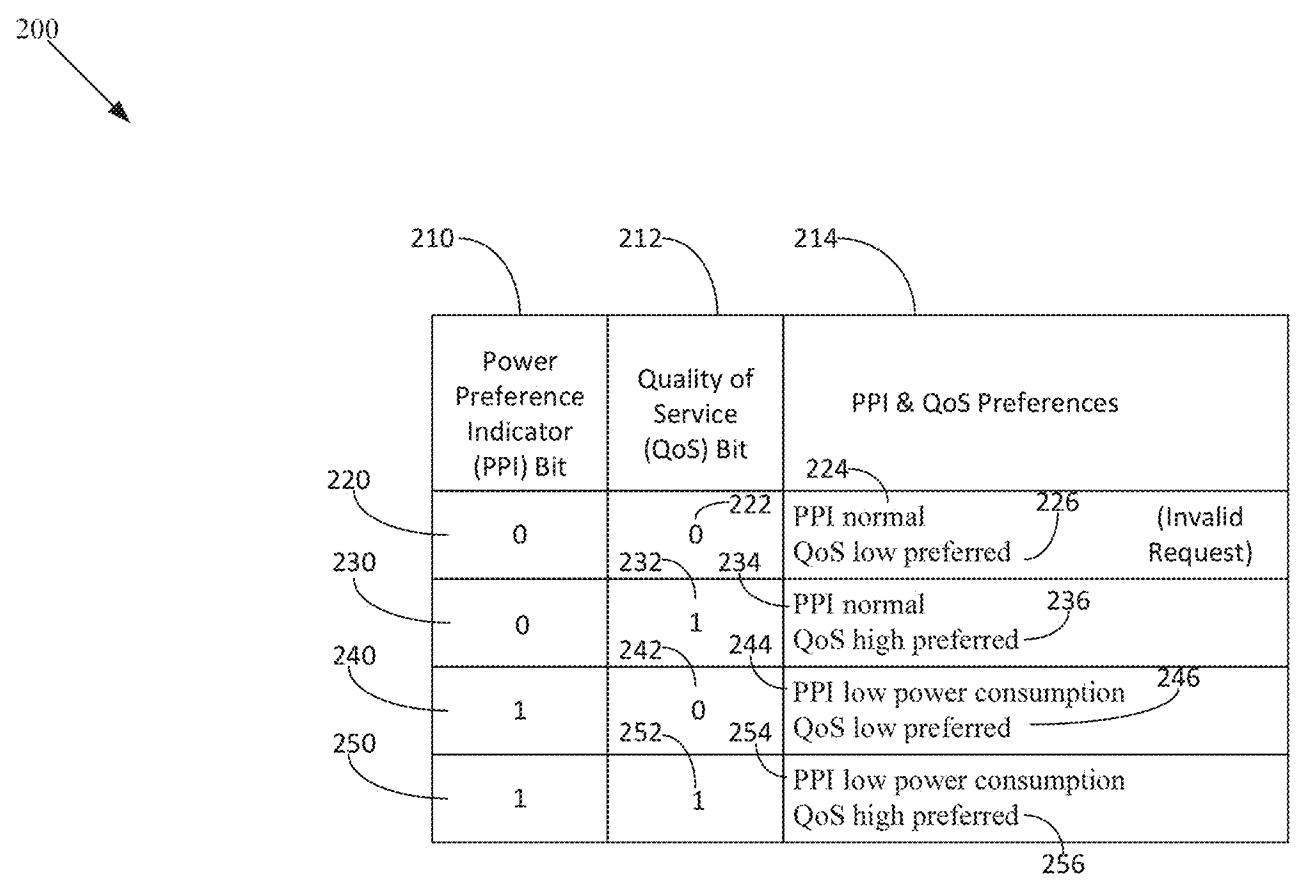

| Power Preference Indicator (PPI) Bit | Quality of Service (QoS) Bit | PPI & QoS Preferences |
|---|---|---|
| 0 | 0 | PPI normal QoS low preferred |
| 0 | 1 | PPI normal QoS high preferred |
| 1 | 0 | PPI low power consumption QoS low preferred |
| 1 | 1 | PPI low power consumption QoS high preferred (Invalid Request) |

Fig. 2

| | | |
|---|---|---|
| Power Preference Indicator (PPI) Bit — 310 | — 312 | — 314 |
| 0 | PPI = normal | Indicates the UE preference for a normal configuration |
| 1 | PPI = low power consumption | Indicates the UE preference for a configuration for that is primarily optimized for power savings |
| Quality of Service (QoS) Bit — 330 | — 342 | — 344 |
| 0 | UE Prefers Configuration Optimized For Power Savings | UE prefers a configuration primarily optimized for power saving, even if there is active traffic and the UE is willing to accept a lower level of QoS |
| 1 | UE Prefers Configuration Optimized for QoS | UE expects that the eNB will change the configuration to satisfy the QoS |

Fig. 3

| | 412 | 414 |
|---|---|---|
| ReportProximityConfig 416 | 0 | Proximity indication is NOT enabled for closed subscriber group (CSG) member cells of the associated radio access technology (RAT) 418 |
| | 1 | Proximity indication is enabled for CSG member cells of the associated RAT 424 |
| powerPrefIndication-Enabled 422 426 | 0 | Power Preference Indication reporting from the UE is NOT allowed 428 |
| | 1 | Power Preference Indication reporting from the UE is allowed 434 |
| powerPrefIndication-Timer 432 | Sx or Sx.x | S0 means the prohibit timer is set to 0 seconds (not set)<br>S0.5 means the prohibit timer is set to 0.5 seconds<br>S1 means the prohibit timer is set to 1 second |
| qosPPIPreference 442 446 | 0 (qospreferred) | eNB indicates to the UE that it prefers QoS over power savings. If PPI = lowPowerConsumption and GBR traffic is initiated, the eNB sets normal configuration to UE for the GBR session without waiting for receiving PPI = normal from the UE. At the end of the session, the eNB may send lowPowerConsumption configuration to the UE 444 |
| | 1 (ppipreferred) | eNB indicates to the UE that it prefers power savings over QoS. eNB assumes that the UE prefers power savings and is willing to accept a low level of QoS. Therefore, if PPI = lowPowerConsumption and GBR traffic is initiated, the eNB may keep the UE in low power consumption configuration. 448 |

Fig. 4

SIGNALING QOS REQUIREMENTS AND UE POWER PREFERENCE IN LTE-A NETWORKS

RELATED APPLICATION

This application is a U.S. National Stage Filing under 35 U.S.C. 371 from International Application Number PCT/US2013/060146, filed on Sep. 17, 2013, which application claims the benefit of priority to U.S. Patent Application Ser. No. 61/721,436, filed on Nov. 1, 2012 and entitled "SIGNALING QOS REQUIREMENTS AND UE POWER PREFERENCE IN LTE-A NETWORKS," which applications are hereby incorporated by reference in their entirety.

BACKGROUND

Low power consumption is a performance indicator for communication network operators and the users of a cellular phone. The power consumption of a User Equipment (UE) is typically described in terms of battery life time, and more specifically in terms of talk time and standby time. On the network side the power consumption is described as the power consumption of network elements, such as transmission nodes or access nodes, wherein power consumption is measured for different configuration and load situations.

Even if a user is not making a call, the mobile phone consumes power. For example, when being switched on but not making any call, which is also referred to that a UE is in an idle mode, the UE usually searches periodically for its environment, e.g. synchronization sequences, reference signals and downlink broadcast channels or the like (the elements to be searched for are defined in the different communication network standards and may be different depending on the actual type of network). Furthermore, when the UE is in the idle mode, downlink pilot signals may be received, and circuitry is run to detect paging channel information in order to get activated if a call is received.

Recently, the idea that a UE may assist the network in making decisions regarding its configuration for power saving has been adopted. This reflects the understanding that the UE may have greater understanding of the applications running on the device. A single bit has been specified called the power preference indication (PPI) bit.

Radio Resource Control (RRC) is used to handle the control plane signaling of Layer 3 between the UEs and the universal terrestrial radio access network UTRAN, e.g., the evolved Node B's (eNBs) and radio network controllers (RNCs) that make up the UMTS radio access network. RRC signaling includes functions for connection establishment and release, broadcast of system information, radio bearer establishment/reconfiguration and release, RRC connection mobility procedures, paging notification and release, outer loop power control, etc. As a part of RRC, a UE in radio resource control connected mode (RRC_CONNECTED) may initiate the UE assistance information procedure whenever the UE wants to provide information to assist the network in configuring radio resources. The UE initiates the UE Assistance Information procedure by sending the UEAssistanceInformation message. Accordingly, the UE sends a PPI indication in a UEAssistanceInformation message to an access point, e.g., an evolved node B (eNB), to set its configuration to low power consumption (PPI=1) or to normal (PPI=0).

When the UE sends PPI=1, the network may respond with a configuration that is optimized for power saving. Otherwise when the UE sends PPI=0, the network provides a configuration that is optimized to provide the UE with the Quality of Service (QoS) guarantees that the UE requested. However, optimizing for power generally has a detrimental impact on performance, most commonly on the delay performance. When the network provides a configuration optimized for power saving, it is possible that the UE may experience delays in its applications' performance. The idea behind PPI was that the UE would send a request for PPI=1 when it was running delay-tolerant applications, such as background traffic. However, there is nothing to preclude the UE from sending PPI=1 and then running a delay-sensitive application. In this case, certain inconsistencies may arise depending upon whether the network chooses to prioritize the PPI over its QoS guarantees or not.

BRIEF DESCRIPTION OF THE DRAWINGS

FIG. 2 illustrates an expanded user assistance information field 200 according to an embodiment;

FIG. 3 illustrates a separate QoS preference bit field 300 according to an embodiment;

FIG. 4 illustrates configuration fields in the OtherConfig information element according to an embodiment;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Figure 1:
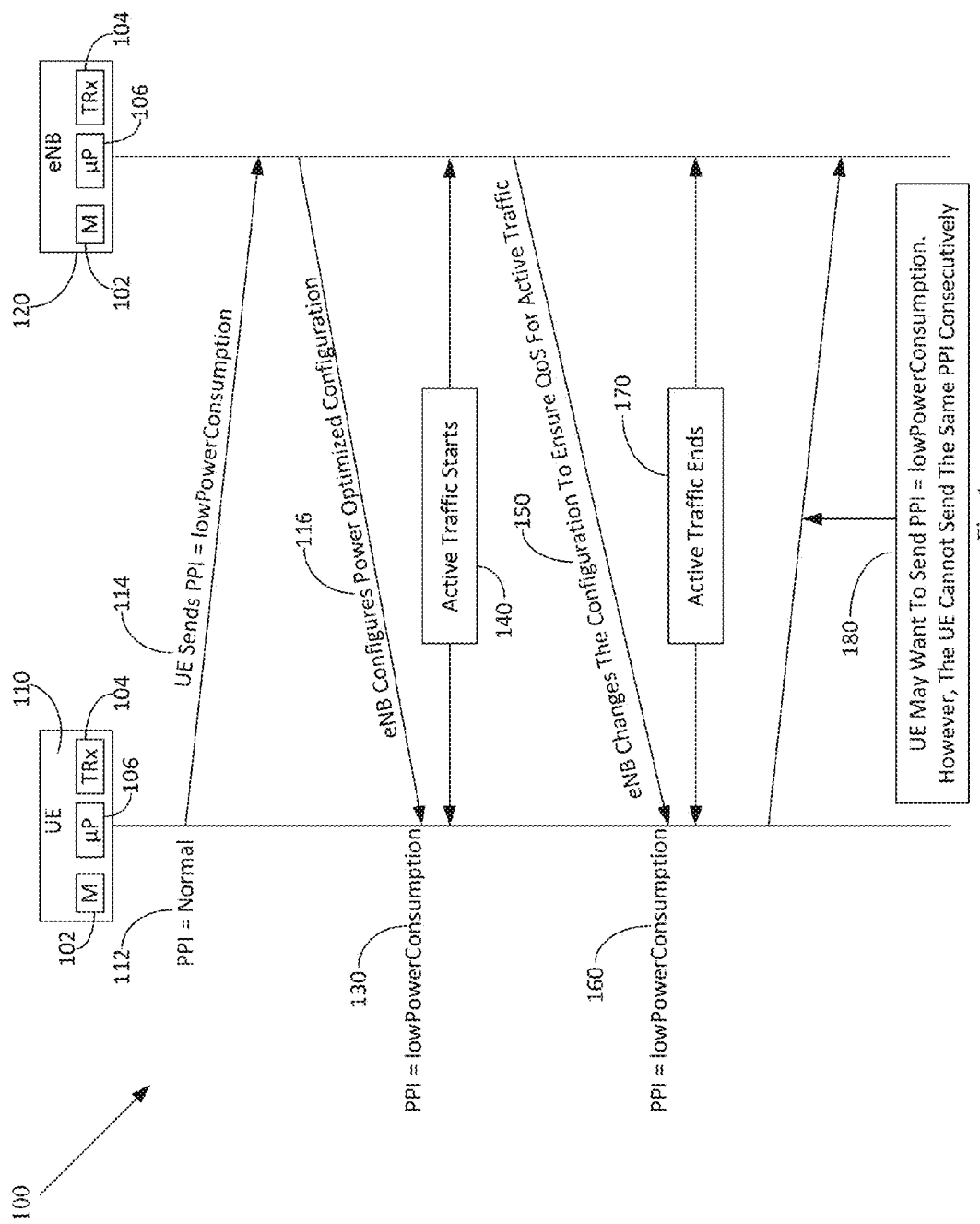
FIG. 1 illustrates an a communications system 100 according to an embodiment.

FIG. 1 illustrates a communications system 100 according to an embodiment. The communications system 100 includes user equipment (UE) and an evolved nodeB (eNB) 120. The UE 110 and the eNB may each include memory 102, a transceiver 104 and a processor 106. Without QoS indication being provided using an additional bit in a message between the UE and the eNB according to an embodiment, the UE 110 and the eNB 120 of the communications system 100 may exchange messages that result in the UE being locked in the normal configuration. For example, in FIG. 1, the UE 110 may initially have PPI set to normal (PPI=0) 112. This state may be set by the eNB when the UE requests connection with the eNB. At some point, the UE may send a UEAssistanceInformation message with PPI=1 (low power consumption) 114 to the eNB 120. The eNB 1 responds by informing the UE 110 that the eNB 120 has configured power optimized configuration 116. The UE has PPI set to lowPowerconsumption 130. For example, an UE 110 can enter idle mode where the UE 110 is no longer actively connected to the eNB, though the network is still able to keep track of the UE 110 through a mechanism known as paging. Idle mode allows the UE 110 to remain in very low power mode since the UE 110 needs to perform a very limited set of functions in this mode. The UE 110 can be paged for downlink (DL) traffic. For uplink (UL) traffic, the UE 110 may initiate a procedure to re-enter the network by sending a connection request to the serving eNB and re-enters into the RRC_Connected state. However, the UE 110 may stay in the low power mode based on the UEAssistanceInformation message sent to the eNB 120, which set the PPI=1 (low power consumption) 114.

At a later time, active traffic may be received 140 at the eNB 120. For example, an application with high QoS requirements, e.g., guaranteed bit rate traffic, may be initiated. The eNB 120 changes the configuration 150 without getting PPI=0 (normal) message from the UE 110. The UE has not changed the PPI setting from lowPowerConsumption 160. At some time thereafter, the high QoS traffic ends 170. The UE 110 cannot repeat 180 its last PPI request, e.g., PPI=1 (low power consumption) 114 to reset PPI for low power consumption.

More specifically, the UE 110 knows that previous PPI 114 sent by it was for low power consumption. However, the UE 1100 is not allowed to send the same PPI consecutively 180. As a result, the next PPI from the UE 110 is expected by the eNB to be for a normal configuration, which already has been set by the eNB through message 150. The UE 110 may need to leave the eNB 120 configured normal configuration in order to go back to a low power consumption configuration, However, the UE 110 cannot send PPI =1 (low power consumption) 114 because the previous PPI was also a request for low power consumption thereby locking the UE 110 in the normal configuration for the rest of the radio resource control (RRC) connection duration. There may be other cases as well, where the Uri: 110 may prefer to optimize for lower power in spite of its QoS guarantees, but has currently no way of letting the eNB 120 know it's preferences.

As shown above, one of the reasons there is a conflict between the power preferences of the UE 110 and the QoS preferences it receives is that there is no way for the UE 110 to express its power and QoS preferences simultaneously to the network, so that both the power preference and the QoS preference may be applied dynamically.

FIG. 2 illustrates an expanded user assistance information field 200 according to an embodiment. In FIG. 2, the number of user assistance information bits has been expanded to 2 bits to send a QoS preference along with the PPI. As shown in FIG. 2, a second bit of information, referred to as the QoS PPI preference 212, is added to the PPI bit 210 to indicate to the eNB the power preferences and QoS preferences 214 of the UE. The second bit 212 can be used either in conjunction with the PPI bit 210 or independently so that the eNB better understands the UE's preferences 214.

If used in conjunction, as shown in FIG. 2, there are four possible combinations in which these bit may be set which may be interpreted as follows.

If the PPI bit is set to 0 220 and the QoS PPI preference bit is set to 0 222, the UE is indicating a normal power consumption preference 224 and a low QoS preference 226. This case is invalid and the eNB may ignore this configuration. Such an indication may be from a non-intelligent UE.

If the PPI bit is set to 0 230 and the QoS PPI preference bit is set to 1 232, the UE is indicating a normal power consumption preference 234 and a high QoS preference 236. In this case, the eNB always optimizes for QoS.

If the PPI bit is set to 1 240 and the QoS PPI preference bit is set to 0 242, the UE is indicating a low power consumption preference 244 and a low QoS preference 246. In this case, the eNB optimizes for power and does not change the power configuration until the UE indicates otherwise by changing the PPI bit.

If the PPI bit is set to 1 250 and the QoS PPI preference bit is set to 1 252, the UE is indicating a low power consumption preference 254 and a high QoS preference 256. In this case, even though PPI is set to low power, the UE indicates that it prefers to make sure that its QoS is not affected. This may be interpreted in several ways. For example, the eNB may choose to configure the UE with any power optimized configuration or if guaranteed bit rate (GBR) traffic is initiated, the eNB may ensure the QoS guarantees of the UE are maintained rather than optimizing power consumption of the UE. Another way this may be interpreted by the eNB is to provide a configuration that is power saving, but still allows the eNB to respond in an efficient manner to achieve the QoS requested by the UE when GBR traffic is detected. The UE listens to the paging indicator channel (PICH) at certain predefined times to reduce power consumption. The periodicity of these searches is called discontinuous reception (DRX) cycle. Thus, this power saving provided by the eNB when GBR traffic is detected may be achieved by extending the DRX cycle of the UE, but by maintaining a high DRX-Inactivity timer so that the UE does not go into DRX quickly when active traffic has begun, thus ensuring delay performance.

FIG. 3 illustrates a separate QoS preference bit field 300 according to an embodiment. Rather than expanding the PPI field in the UEAssistanceInformation message to indicate a QoS preference, a separate QoS preference bit field 330 is used. A PPI bit 302 may be provided. The PPI bit 302 may be set to 0 310. This sets the PPI to normal 312 thereby indicating the UE prefers a normal power consumption mode 314. If the PPI bit 302 is set to 1 320, the PPI is set to low power consumption and the eNB knows that the UE has a preference for a configuration that is primarily optimized for power savings 324.

The QoS message may be defined in the IE PowerPrefIndicationl to carry UE power saving preference in case of QoS traffic. The UE sends the QoS preference bit 330 to the eNB. When the QoS preference bit is set to 1 350, the qosPPIPreference-rll=qosPreferred indicating the UE prefers a configuration optimized for QoS 352. The UE expects that the eNB will change the configuration to satisfy the QoS 354. In other words, the eNB knows that the UE prefers QoS over power saving. Therefore, if PPI=lowPowerConsumption 322 and GBR traffic is initiated, the eNB may set a normal configuration 312 for the UE during the GBR session without waiting for receiving PPI normal 312 from the UE. The UE suspends UE assistance operations until the UE receives a lowPowerConsumption configuration 322 from the eNB. At the end of the GBR traffic session, the eNB may send lowPowerConsumption configuration 322 to the UE.

When qosPPIPreference-rll=ppipreferred by setting the QoS preference bit 330 to 0 340, the eNB knows that UE prefers power saving 342 and that the UE is therefore willing to accept a low level of QoS. The eNB keeps the UE in lowPowerConsumption configuration even if an active traffic starts 344.

FIG. 4 illustrates configuration fields in the OtherConfig information element 400 according to an embodiment. The OtherConfig information element 400 is used by the eNB to provide indication of preferences to the UE. The OtherConfig information element 400 includes a ReportProximityConfig field 410. If the ReportProximityConfig field 410 is set to 0 412, the proximity indication is not enabled for closed subscriber group (CSG) member cells of the associated radio access technology (RAT) 414. If the ReportProximityConfig field 410 is set to 1 416, the proximity indication is enabled for CSG member cells of the associated RAT 418.

The OtherConfig information element 400 also includes a powerPrefIndication-Enabled field 420. If the powerPrefIndication-Enabled field 420 is set to 0 422, the power preference indicator reporting form the UE is not allowed 424. If the powerPrefIndication-Enabled field 420 is set to 1 426, the power preference indicator reporting form the UE is allowed 428.

The OtherConfig information element 400 also includes a powerPrefIndication-Timer 430. The powerPrefIndication-Timer field 430 may be set using a format of Sx or Sx.x 432. As shown in FIG. 4, the powerPrefIndication-Timer field 430 set to S0 means the prohibit timer is set to 0 seconds (not set), to S0.5 means the prohibit timer is set to 0.5 seconds and to SI means the prohibit timer is set to 1 second 434.

The OtherConfig information element 400 also includes a qosPPIPreference field 440. Rather than the UE sending the eNB an indication of preferences, the eNB may send an enbqosPPIPreference bit, i.e., the qosPPIPreference bit 440. According to FIG. 4, when enbqosPPIPreference-rll field is set to 0, i.e., qospreferred 442, the eNB informs the UE that it gives more priority to QoS over power saving 444. Therefore, if PPI=lowPowerConsumption and GBR traffic is initiated, the eNB sets normal configuration to UE for the GBR session without waiting for receiving PPI=normal from the UE. The UE is suspended from sending UE assistance operation for the duration of GBR traffic. At the end of GBR traffic session, the eNB may send low PowerConsumption configuration to the UE.

When enbqosPPIPreference-rll is set to 1, i.e., ppipreffered 446, the eNB indicates that it assumes that the UE prefers power saving and therefore that the UE is willing to accept a low level of QoS 448. The eNB keeps the UE in lowPower-Consumption configuration even if an active/GBR traffic starts. However, the QoS level may be lower.

Figure 5:
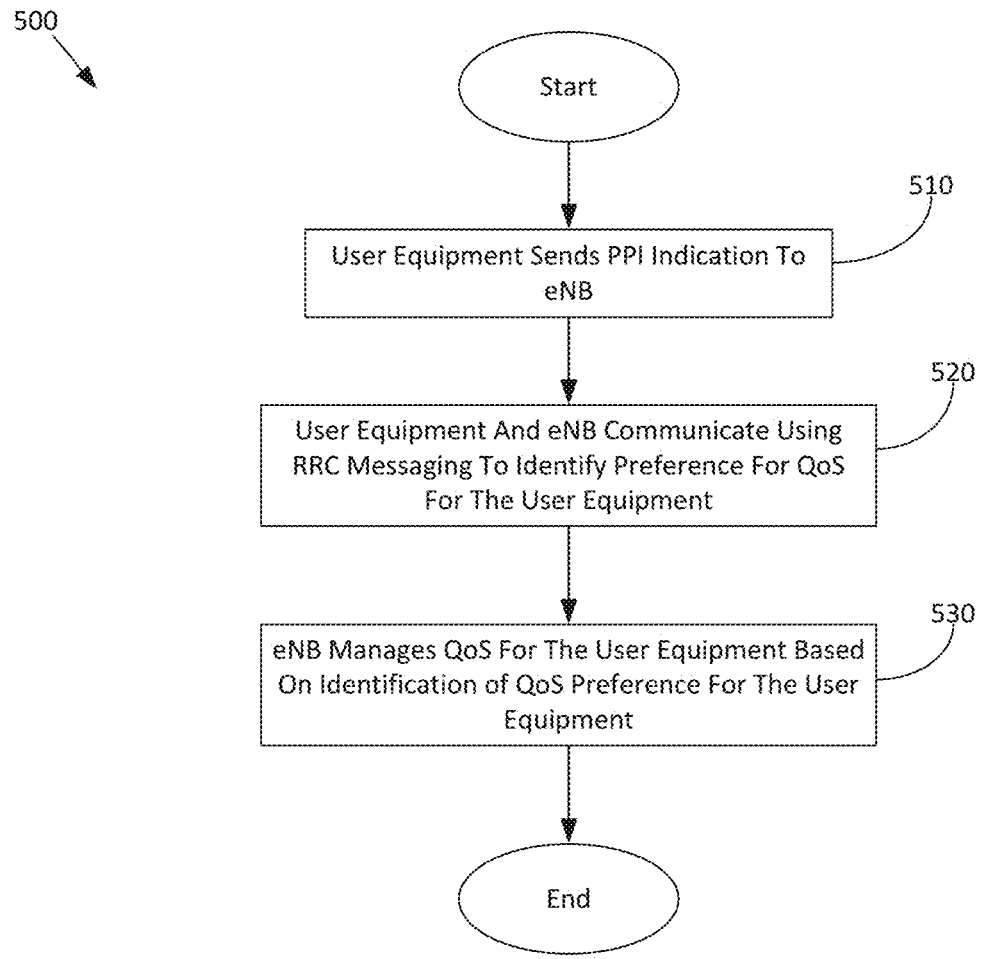
FIG. 5 is a flowchart for signaling QoS requirements and UE power preference in LTA-A networks according to an embodiment.

FIG. 5 is a flowchart 500 for signaling QoS requirements and UE power preference in LTA-A networks according to an embodiment. In FIG. 5, UE sends a PPI indication to the eNB 510. The UE and the eNB communicate using RRC messaging to identify preference for QoS for the user equipment 520. The UE may indicate a QoS preference to the eNB using a QoS bit. The QoS bit may be combined with the PPI in a UEAssistanceInformation message. In another embodiment, the eNB may indicate a QoS that the eNB prefers using a QoS preference message. The eNB manages QoS for the user equipment based on identification of QoS Preference for the UE 530.

Figure 6:
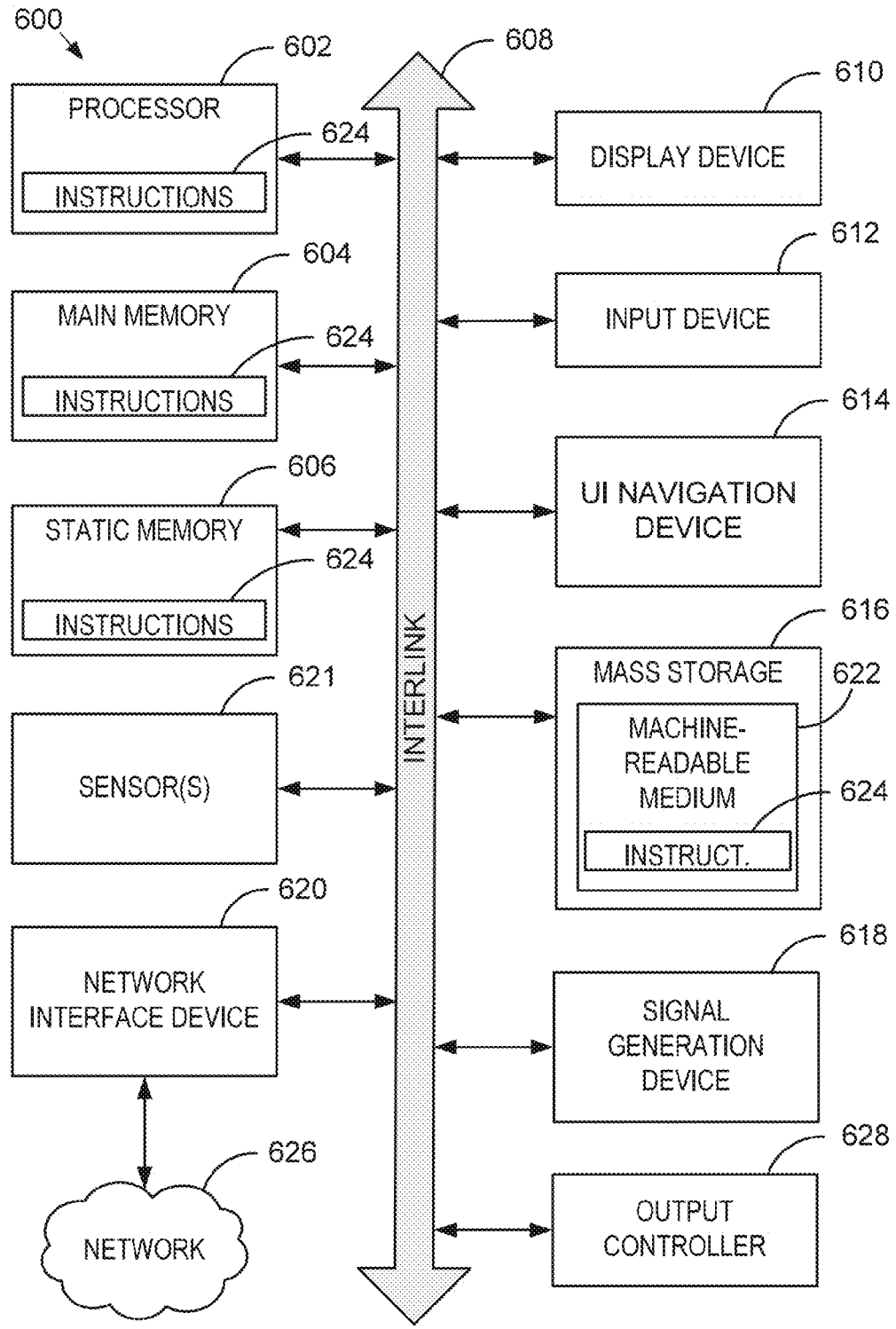
FIG. 6 illustrates a block diagram of an example machine for signaling QoS requirements and UE power preference in LTA-A network according to an embodiment.

FIG. 6 illustrates a block diagram of an example machine 600 for signaling QoS requirements and UE power preference in LTA-A networks according to an embodiment upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine and/or a client machine in server-client network environments. In an example, the machine 600 may act as a peer machine in peer-to-peer (P2P) (or other distributed) network environment. The machine 600 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 602 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 602 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 600 may include a hardware processor 602 (e.g., a central processing unit (CPU), a graphics processing unit (GPU), a hardware processor core, or any combination thereof), a main memory 604 and a static memory 606, at least some of which may communicate with others via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR)) connection to communicate or control one or more peripheral devices (e.g., a printer, card reader, etc.).

The storage device 616 may include at least one machine readable medium 622 on which is stored one or more sets of data structures or instructions 624 (e.g., software) embodying or utilized by any one or more of the techniques or functions described herein. The instructions 624 may also reside, at least partially, additional machine readable memories such as main memory 604, static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) that configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES & EXAMPLES

Example 1 includes subject matter (such as a method or means for performing acts) for signaling quality of service (QoS) requirements and user equipment (UE) power preference in LTE-A networks, including receiving, at an evolved nodeB (eNB), a power preference indication (PPI) from a UE to set a power saving preference for the UE, providing a communication session using radio resource control (RRC) messages between the UE and the eNB to identify a preference for QoS configuration for handling traffic provided to the UE by the eNB and managing, by the eNB, the QoS configuration for handling traffic provided by the eNB to the UE based on the identified preference for QoS configuration for handling traffic provided to the UE.

Example 2 may optionally include the subject matter of Example 1, wherein the providing the communication session using RRC message between the UE and the eNB comprises sending a message to the eNB by the UE providing a bit indicating a QoS preference for the UE.

Example 3 may optionally include the subject matter of Examples 1-2, wherein the sending the message to the eNB providing a bit indicating a QoS preference for the UE comprises adding a QoS preference indication bit to a power preference indication field to provide the indication of the QoS preference of the UE, the power preference indication field consisting of a power preference indication bit and the QoS preference indication bit.

Example 4 may optionally include the subject matter of Examples 1-3, further comprising setting the power preference indication bit and the QoS preference indication bit to a two-bit binary value, the two-bit binary value comprising the power preference indication bit being set to a first value for indication to the eNB of a preference by the UE for a normal power configuration and the QoS preference indication bit being set to a first value for indication to the eNB of a preference by the UE for a high QoS configuration to satisfy a QoS guarantee of the UE.

Example 5 may optionally include the subject matter of Examples 1-4, further comprising setting the power preference indication bit and the QoS preference indication bit to a two-bit binary value, the two-bit binary value comprising the power preference indication bit being set to a second value for indication to the eNB of a preference by the UE for a low power consumption configuration and the QoS preference indication bit being set to a second value for indication to the eNB of a preference by the UE for using a low QoS configuration.

Example 6 may optionally include the subject matter of Examples 1-5, wherein the using the low QoS configuration provides low QoS in a power saving configuration when active traffic for the UE is received by the eNB.

Example 7 may optionally include the subject matter of Examples 1-6, further comprising setting the power preference indication bit and the QoS preference indication bit to a two-bit binary value, the two-bit binary value comprising the power preference indication bit being set to a first value for indication to the eNB of a preference by the UE for a normal power configuration and the QoS preference indication bit being set to a second value for indication to the eNB of a preference by the UE for using a high QoS configuration to satisfy a QoS guarantee of the UE.

Example 8 may optionally include the subject matter of Examples 1-7, wherein the sending the message to the eNB providing a bit indicating a QoS preference for the UE comprises defining a QoS PPI preference in a power preference indication information element to carry a UE power saving preference and the QoS PPI preference and sending the power preference indication information element to the eNB to indicate a power preference and a QoS preference of the UE.

Example 9 may optionally include the subject matter of Examples 1-8, wherein the defining the QoS PPI preference further comprises providing a bit for defining a first state for the QoS PPI preference and a second state for the QoS PPI preference, wherein the first state indicates that the UE prefers a configuration that is primarily optimized for power saving and that the UE will use a lower QoS even when active traffic is present and the second state indicates that the eNB is to change the configuration to satisfy the QoS of active traffic to the UE.

Example 10 may optionally include the subject matter of Examples 1-9, wherein the providing the communication session using RRC message between the UE and the eNB comprises sending a message to the UE from the eNB using a bit to indicate a QoS preference for the UE.

Example 11 may include subject matter (such as a device, apparatus, client or system) including memory for storing data, a transceiver for transmitting data and a processor, coupled to the transceiver and memory, the processor arranged to send an evolved nodeB (eNB) a power preference indication (PPI) to set a power saving preference, provide a communication session using radio resource control (RRC) messages between the transceiver and the eNB to identify a preference for QoS configuration for handling traffic by the eNB and manage, the QoS configuration for handling traffic by the eNB based on the identified preference for QoS configuration for handling traffic.

Example 12 may optionally include the subject matter of Example 11, wherein the processor provides the communication session using RRC message between the UE and the eNB by sending a message to the eNB by the UE providing a bit indicating a QoS preference for the UE.

Example 13 may optionally include the subject matter of Examples 11-12, wherein processor sends the message to the eNB providing the bit indicating the QoS preference by adding a QoS preference indication bit to a power preference indication field to provide the indication of the QoS preference, the power preference indication field consisting of a power preference indication bit and the added QoS preference indication bit.

Example 14 may optionally include the subject matter of Examples 11-13, wherein the processor sets the power preference indication bit and the QoS preference indication bit to a two-bit binary value, the two-bit binary value comprising the power preference indication bit being set by the processor to a first value for indication to the eNB of a preference by the UE for a normal power configuration and the QoS preference indication bit being set by the processor to a first value for indication to the eNB of a preference by the UE for a high QoS configuration to satisfy a QoS guarantee of the UE.

Example 15 may optionally include the subject matter of Examples 11-14, wherein the processor sets the power preference indication bit and the QoS preference indication bit to a two-bit binary value, the two-bit binary value comprising the power preference indication bit being set by the processor to a second value for indication to the eNB of a preference by the UE for a low power consumption configuration and the QoS preference indication bit being set by the processor to a second value for indication to the eNB of a preference by the UE for using a low QoS configuration.

Example 16 may optionally include the subject matter of Examples 11-15, wherein the processor uses the low QoS configuration to provide low QoS in a power saving configuration when active traffic for the UE is received by the eNB.

Example 17 may optionally include the subject matter of Examples 11-16, wherein the processor sets the power preference indication bit and the QoS preference indication bit to a two-bit binary value, the two-bit binary value comprising the power preference indication bit being set to a first value for indication to the eNB of a preference by the UE for a normal power configuration and the QoS preference indication bit being set to a second value for indication to the eNB of a preference by the UE for using a low QoS configuration.

Example 18 may optionally include the subject matter of Examples 11-17, wherein the processor sends the message to the eNB to provide the bit indicating the QoS preference for the UE by defining a QoS PPI preference in a power preference indication information element to indicate a UE power saving preference and the QoS PPI preference and sending the power preference indication information element to the eNB to indicate the UE power saving preference and the QoS preference to the eNB.

Example 19 may optionally include the subject matter of Examples 11-18, wherein the processor defines the QoS PPI preference by providing a bit for defining a first state for the QoS PPI preference and a second state for the QoS PPI preference, wherein the first state indicates that the UE prefers a configuration that is primarily optimized for power saving and that the UE will use a lower QoS even when active traffic is present and the second state indicates to the eNB to change the configuration to satisfy the QoS configuration for handling traffic to the UE Example 20 may include subject matter (such as a device, apparatus, client or system) including memory for storing data, a transceiver for transmitting and receiving data and a processor, coupled to the transceiver and memory, the processor arranged to receive from an UE a power preference indication (PPI) to set a power saving preference for the UE, provide a communication session using radio resource control (RRC) messages between the transceiver and the UE to identify a preference for QoS configuration for handling traffic to the UE and manage, the QoS configuration for handling traffic provided to the UE based on the identified preference for QoS configuration for handling traffic.

Example 21 may optionally include the subject matter of Examples 20-20, wherein the processor provides the communication session using the RRC message between the UE and the transceiver by receiving a message from the UE providing a bit indicating a QoS preference for the UE.

Example 22 may optionally include the subject matter of Examples 20-21, wherein the processor receives the message providing the bit indicating a QoS preference for the UE, wherein a QoS PPI preference is defined in a power preference indication information element to carry a UE power saving preference and the QoS PPI preference, the processor receiving the power preference indication information element indicating the a power preference and the QoS preference of the UE.

Example 23 may optionally include the subject matter of Examples 20-22, wherein the QoS PPI preference further comprises a bit for defining a first state for the QoS PPI preference and a second state for the QoS PPI preference, wherein the first state indicates that the UE prefers a configuration that is primarily optimized for power saving and that the UE will use a lower QoS even when active traffic is present and the second state indicates that the configuration is to be changed by the processor to satisfy the QoS of active traffic to the UE.

Example 24 may optionally include the subject matter of Examples 20-23, wherein the processor provides the communication session using the RRC messages between the transceiver and the UE by sending a message to the UE via the transceiver using a bit to indicate a QoS preference to be used by the processor for handling traffic to the UE.

Example 25 may optionally include the subject matter of Examples 20-24, wherein the processor receives the message providing the bit indicating the QoS preference for the UE including an additional QoS preference indication bit provided to a power preference indication field to provide the indication of the QoS preference of the UE, the power preference indication field consisting of a power preference indication bit and the QoS preference indication bit.

Example 26 may optionally include the subject matter of Examples 20-25, wherein the processor analyzes the power preference indication field to determine a two-bit binary value provided by the power preference indication field, wherein the two bit binary value provided by the power preference indication field comprising the power preference indication bit being set to a first value for indicating a preference by the UE for a normal power configuration and the QoS preference indication bit being set to a first value for indicating a preference by the UE for a high QoS configuration to satisfy a QoS guarantee of the UE.

Example 27 may optionally include the subject matter of Examples 20-26, wherein the processor analyzes the power preference indication field to determine a two-bit binary value provided by the power preference indication field, wherein the two bit binary value provided by the power preference indication field comprising the power preference indication bit being set to a second value for indicating a preference by the UE for a low power consumption configuration and the QoS preference indication bit being set to a second value for indicating a preference by the UE for using a low QoS configuration.

Example 28 may optionally include the subject matter of Examples 20-27, wherein the processor uses the indicated preference by the UE to use a lower QoS configuration to provide low QoS in a power saving configuration for the UE when active traffic for the UE is received by the transceiver.

Example 29 may optionally include the subject matter of Examples 20-28, wherein the processor analyzes the power preference indication field to determine a two-bit binary value provided by the power preference indication field, wherein the two bit binary value provided by the power preference indication field comprising the power preference indication bit being set to a first value for indicating a preference by the UE for a normal power configuration and the QoS preference indication bit being set to a second value for indicating a preference by the UE for using a high QoS configuration to satisfy a QoS guarantee of the UE.

Example 30 may include subject matter (such as means for performing acts or machine readable medium including instructions that, when executed by the machine, cause the machine to perform acts) including receiving, at an evolved nodeB (eNB), a power preference indication (PPI) from a UE to set a power saving preference for the UE, providing a communication session using radio resource control (RRC) messages between the UE and the eNB to identify a preference for QoS configuration for handling traffic provided to the UE by the eNB and managing, by the eNB, the QoS for traffic provided by the eNB to the UE based on the identified reference for QoS configuration for handling traffic provided to the UE.

Example 31 may optionally include the subject matter of Example 30, wherein the providing the communication session using RRC message between the UE and the eNB comprises sending a message to the eNB by the UE providing a bit indicating a QoS preference for the UE.

Example 32 may optionally include the subject matter of Examples 30-31, wherein the sending the message to the eNB providing a bit indicating a QoS preference for the UE comprises adding a QoS preference indication bit to a power preference indication field to provide the indication of the QoS preference of the UE, the power preference indication field consisting of a power preference indication bit and the QoS preference indication bit.

Example 33 may optionally include the subject matter of Examples 30-32, further comprising setting the power preference indication bit and the QoS preference indication bit to a two-bit binary value, the two-bit binary value comprising the power preference indication bit being set to a first value for indication to the eNB of a preference by the UE for a normal power configuration and the QoS preference indication bit being set to a first value for indication to the eNB of a preference by the UE for a high QoS configuration to satisfy a QoS guarantee of the UE.

Example 34 may optionally include the subject matter of Examples 30-33, further comprising setting the power preference indication bit and the QoS preference indication bit to a two-bit binary value, the two-bit binary value comprising the power preference indication bit being set to a second value for indication to the eNB of a preference by the UE for a low power consumption configuration and the QoS preference indication bit being set to a second value for indication to the eNB of a preference by the UE for using a low QoS configuration.

Example 35 may optionally include the subject matter of Examples 30-34, wherein the using the low QoS configuration provides low QoS in a power saving configuration when active traffic for the UE is received by the eNB.

Example 36 may optionally include the subject matter of Examples 30-35, further comprising setting the power preference indication bit and the QoS preference indication bit to a two-bit binary value, the two-bit binary value comprising the power preference indication bit being set to a first value for indication to the eNB of a preference by the UE for a normal power configuration and the QoS preference indication bit being set to a second value for indication to the eNB of a preference by the UE for using a high QoS configuration to satisfy a QoS guarantee of the UE.

Example 37 may optionally include the subject matter of Examples 30-36, wherein the sending the message to the eNB providing a bit indicating a QoS preference for the UE comprises defining a QoS PPI preference in a power preference indication information element to carry a UE power saving preference and the QoS PPI preference and sending the power preference indication information element to the eNB to indicate a power preference and a QoS preference of the UE.

Example 38 may optionally include the subject matter of Examples 30-37, wherein the defining the QoS PPI preference further comprises providing a bit for defining a first state for the QoS PPI preference and a second state for the QoS PPI preference, wherein the first state indicates that the UE prefers a configuration that is primarily optimized for power saving and that the UE will use a lower QoS even when active traffic is present and the second state indicates that the eNB is to change the configuration to satisfy the QoS of active traffic to the UE.

Example 39 may optionally include the subject matter of Examples 30-38, wherein the providing the communication session using RRC message between the UE and the eNB comprises sending a message to the UE from the eNB using a bit to indicate a QoS preference for the UE.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for signaling quality of service (QoS) requirements and user equipment (UE) power preference in LTE-A networks, comprising:
    receiving, at an evolved nodeB (eNB), a message comprising a power preference indication (PPI) from a UE to set a power saving preference for the UE to execute in a low power consumption configuration when handling data traffic provided by the eNB and a QoS preference when handling data traffic provided by the eNB, the message further comprising:
        a PPI field comprising a PPI bit that indicates the PPI and a QoS preference indication bit that indicates the QoS preference, in which the PPI bit takes values that specify between a normal power consumption configuration and the low power consumption configuration and the QoS preference indication bit takes values that specify between a high QoS configuration whose use satisfies a QoS guarantee for the UE and a low QoS configuration whose use provides low QoS for the UE in the low power consumption configuration;
    detecting a conflict between the PPI and the QoS preference in which the conflict causes the UE, in observation of the QoS preference, to consume more power than the low power consumption configuration; and
    managing, by the eNB, a QoS configuration for data traffic provided by the eNB based on the identified QoS preference such that one of a configuration that is primarily optimized for power saving and a configuration to satisfy the QoS of active traffic is selected to resolve the conflict between the PPI and the QoS preference based on the message.

2. The method of claim 1, wherein the message comprises the QoS preference indication bit added to the PPI field to provide the indication of the QoS preference of the UE, the PPI field consisting of the PPI bit and the QoS preference indication bit.

3. The method of claim 1 wherein an allowable combination of the PPI bit and the QoS preference indication bit comprises the PPI bit being set to a first value for indication to the eNB of a preference by the UE for the normal power configuration and the QoS preference indication bit being set to a first value for indication to the eNB of a preference by the UE for the high QoS configuration to satisfy the QoS guarantee of the UE.

4. The method of claim 1 wherein an allowable combination of the PPI bit and the QoS preference indication bit comprises the PPI bit being set to a second value for indication to the eNB of a preference by the UE for the low power consumption configuration and the QoS preference indication bit being set to a second value for indication to the eNB of a preference by the UE for using the low QoS configuration, wherein the using the low QoS configuration provides low QoS in a power saving configuration when active traffic for the UE is received by the eNB.

5. The method of claim 1, further comprising ignoring, at the eNB, at least one combination of PPI bit and QoS preference indication bit as invalid.

6. The method of claim 1, wherein:
    the message is a UEAssistanceInformation message initiated by the UE and received when the UE is in Radio Resource Control (RRC) connected mode.

7. A user equipment (UE), comprising:
    memory for storing data;
    a transceiver for transmitting data; and
    a processor, coupled to the transceiver and memory, the processor arranged to:
        send an evolved nodeB (eNB) a message comprising a power preference indication (PPI) bit providing a PPI to set a power saving preference indicating the UE is to execute in a low power consumption configuration when handling data traffic provided by the eNB and a QoS preference when handling data traffic provided by the eNB, the message further comprising:
            a PPI field comprising the PPI bit that indicates the PPI and a QoS preference indication bit that indicates the QoS preference, in which the PPI bit takes values that specify between a normal power consumption configuration and the low power consumption configuration and the QoS preference indication bit takes values that specify between a high QoS configuration whose use satisfies a QoS guarantee for the UE and a low QoS configuration whose use provides low QoS for the UE in the low power consumption configuration; and handling data traffic provided by the eNB based on a QoS configuration selected by the eNB when a conflict is detected between the PPI and the QoS preference, wherein the QoS configuration selected is one of a configuration that is primarily optimized for power saving and a configuration to satisfy the QoS of active traffic.

8. The UE of claim 7, wherein the message comprises the QoS preference indication bit added to the PPI field to provide the indication of the QoS preference, the PPI field consisting of the PPI bit and the added QoS preference indication bit.

9. The UE of claim 8, wherein the processor sets the PPI bit and the QoS preference indication bit to an allowable combination that comprises the PPI bit being set to a first value for indication to the eNB of a preference by the UE for the normal power configuration and the QoS preference indication bit being set to a first value for indication to the eNB of a preference by the UE for the high QoS configuration to satisfy the QoS guarantee of the UE.

10. The UE of claim 8 wherein the processor sets the PPI bit and the QoS preference indication bit to an allowable combination that comprises the PPI bit being set to a second value for indication to the eNB of a preference by the UE for the low power consumption configuration and the QoS preference indication bit being set to a second value for indication to the eNB of a preference by the UE for using the low QoS configuration, wherein the processor uses the low QoS configuration to provides low QoS in a power saving configuration when active traffic for the UE is received by the eNB.

11. The UE of claim 7, wherein the UE is one of:
an intelligent UE in which the processor is further arranged to determine at least one combination of PPI bit and QoS preference indication bit as invalid and avoid transmission of the at least one combination of PPI bit and QoS preference indication bit to the eNB; and
a non-intelligent UE in which the processor is further arranged to transmit the at least one combination of PPI bit and QoS preference indication bit to the eNB.

12. An evolved nodeB (eNB), comprising:
memory for storing data;
a transceiver for transmitting and receiving data; and
a processor, coupled to the transceiver and memory, the processor arranged to:
receive from a user equipment (UE) a message comprising a power preference indication (PPI) to set a power saving preference for the UE to execute in a low power consumption configuration when handling data traffic provided by the eNB and a QoS preference when handling data traffic provided by the eNB, the message further comprising:
a PPI field comprising a PPI bit that indicates the PPI and a QoS preference indication bit that indicates the QoS preference, in which the PPI bit takes values that specify between a normal power consumption configuration and the low power consumption configuration and the QoS preference indication bit takes values that specify between a high QoS configuration whose use satisfies a QoS guarantee for the UE and a low QoS configuration whose use provides low QoS for the UE in the low power consumption configuration, and
detect a conflict between the PPI and the QoS preference in which the conflict causes the UE, in observation of the QoS preference, to cause the UE to consume more power than the low power consumption configuration; and
manage, a QoS configuration for data traffic provided to the UE based on the identified QoS preference such that one of a configuration that is primarily optimized for power saving and a configuration to satisfy the QoS of active traffic is selected to resolve the conflict between the PPI and the QoS preference based on the message.

* * * * *